(12) United States Patent
Gurreri et al.

(10) Patent No.: US 7,789,572 B2
(45) Date of Patent: Sep. 7, 2010

(54) TRANSCEIVER HAVING A PHYSICAL SECURITY FEATURE

(75) Inventors: Michael Lawrence Gurreri, York, PA (US); David Robert Baechtle, Dillsburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 90 days.

(21) Appl. No.: 12/061,064

(22) Filed: Apr. 2, 2008

(65) Prior Publication Data

US 2009/0098760 A1 Apr. 16, 2009

(51) Int. Cl.
*G02B 6/38* (2006.01)
(52) U.S. Cl. .......................... 385/58; 439/680
(58) Field of Classification Search .............. 385/56, 385/58, 76, 77, 78, 85; 439/488, 677, 680
See application file for complete search history.

(56) References Cited

U.S. PATENT DOCUMENTS 5,729,644 A * 3/1998 Shiflett et al. .................. 385/59
6,357,930 B1 * 3/2002 Wiltjer ......................... 385/60
6,960,025 B2 * 11/2005 Gurreri ......................... 385/58
7,207,724 B2 * 4/2007 Gurreri ......................... 385/58
7,325,976 B2 * 2/2008 Gurreri et al. .................. 385/58

* cited by examiner

*Primary Examiner*—Thanh-Tam T Le (57) ABSTRACT

A secure transceiver system for use with a connector system comprising a set of plugs, each plug having a housing having a front and back orientation and having a front face defining an opening, said ferrule being disposed within said opening, said housing defining a first keying element on said front face around said opening, said keying element for each plug of said set of plugs being different; said secure transceiver system comprising: a set of transceivers, each transceiver having a different receptacle, each receptacle having an opening to receive said plug and a ferrule-receiving portion to receive said ferrule, said ferrule-receiving portion defining a second keying element to cooperate with said first keying element, said second keying element for each receptacle being different and being adapted to cooperate with one and only one of said first keying elements, wherein plugs and receptacles having keying elements that cooperate are mating pairs.

15 Claims, 11 Drawing Sheets

TRANSCEIVER HAVING A PHYSICAL SECURITY FEATURE

CROSS REFERENCE TO RELATED APPLICATIONS

This application claims priority to U.S. Provisional Application No. 60/218,705, filed Jul. 17, 2000, U.S. application Ser. No. 09/908,140 filed Jul. 17, 2001, and U.S. application Ser. No. 10/982,374, filed Nov. 4, 2004, all of which are hereby incorporated by reference.

FIELD OF INVENTION

The present invention relates generally to connectors for use in telecommunication networks such as voice, data or video networks. More specifically, to a connector system comprising a transceiver which will mate only with certain plugs to provide discriminating access to particular information networks.

BACKGROUND

A need has developed to limit user access in data networks for security or other purposes. In recent years, buildings/offices are being equipped with different information networks, each having access to different data. It is important to restrict access to these networks to only authorized users. While some restrictions may be achieved using software approaches, such as passwords, the applicants have identified the need to restrict access further using some type of "physical barrier" to the networks. The present invention fulfills this need among others.

SUMMARY OF INVENTION

The present invention provides a secure transceiver, which uses physical barriers to prevent unauthorized users from connecting to the transceiver, and thereby to the data network with which it interfaces. More specifically, the applicants recognize that the best protection against unauthorized users "hacking" into a data network containing confidential information is to prevent them from even connecting to the network. This can be accomplished using physical barriers which allow only certain plugs to mate with the transceiver. One way to do this is to jumper the transceiver to a secure receptacle connector, thereby using the secure receptacle connectors as the gatekeeper. Although this approach is effective, it may be more convenient at times to plug directly into the transceiver and eliminate the need for a jumpered secure receptacle. To this end, the present invention facilitates discriminating mating among similar, but different, plugs and transceivers by using a system of geometrically matched connector components which allows certain combinations of plugs and transceivers—i.e., mating pairs—to mate, while preventing other combinations from mating. Thus, the connector system of the present invention imparts physical security to a particular data network by ensuring that only authorized users who possess a particular plug can physically connect to a transceiver of the particular data network. In addition, in a basic fiber optic link, secure elements at each separable junction provides physical security throughout the entire network system.

Accordingly, one aspect of the invention is a network that uses a connector system that provides discriminating mating between plugs and transceivers. In a preferred embodiment, the network comprises: (a) a plurality of different transceivers, each different transceiver having a different receptacle for facilitating a connection to different information networks requiring different access authorization, each different transceiver being optically or electrically coupled to one and only one different information network, each different receptacle having an inner surface with a unique first geometry; and (b) a plurality of different plugs, each different plug having a unique second geometry, the each unique first geometry corresponds to one, and only one, unique second geometry of a plug such that the plugs and receptacles having corresponding unique first and second geometries are mating pairs.

Another aspect to the invention is a secure transceiver system for use with a secure set of plugs. In a preferred embodiment, each plug has a housing having a front and back orientation and having a front face defining an opening, the ferrule being disposed within the opening, the housing defining a first keying element on the front face around the opening, the keying element for each plug of the set of plugs being different; the secure transceiver system comprises a set of transceivers, each transceiver having a different receptacle, each receptacle having an opening to receive the plug and a ferrule-receiving portion to receive the ferrule, the ferrule-receiving portion defining a second keying element to cooperate with the first keying element, the second keying element for each receptacle being different and being adapted to cooperate with one and only one of the first keying elements, wherein plugs and receptacles having keying elements that cooperate are mating pairs.

Yet another aspect to the invention is a system of secure transceivers within a family of secure and standard connector components. The standard connector components comprise a standard plug and standard transceiver having a standard receptacle. The secure connector system provides discriminating mating among secure and standard plugs and secure transceivers. In a preferred embodiment, the secure connector system comprising: (a) at least a first plug and a second plug, the first plug comprising a first key in a first position, the second plug comprising a second key in a second position, the first and second positions being different, the first and the plugs each comprising a secondary key, the secondary key being in the same relative position on the first and second plugs, the first and second plugs being physically the same except for the position of their respective key; (b) at least a first transceiver and a second transceiver having first and second receptacles respectively, the first receptacle having a first slot in a first position and a secondary key, the first slot adapted to receive the first key and the secondary slot adapted to receive the secondary key to allow the first plug to mate with the first receptacle to form a mating pair, the first key interfering with a second receptacle to prevent the first plug from mating with the second receptacle, the second receptacle having a second slot in a second position and a secondary key, the secondary slots of the first and second receptacles being in the same relative position, the second slot being adapted to receive the second key and the secondary slot being adapted to receive the secondary key to allow the second plug to mate with the second receptacle to form a mating pair, the second key interfering with the first receptacle to prevent the second plug from mating with the first receptacle; wherein the standard plug does not have a secondary slot, and the standard receptacle does not have a secondary key; and wherein the first and second keys of the first and second plugs interfere with the standard receptacle to prevent the first and second plugs from mating with the standard receptacle; wherein the secondary keys of the first and second receptacles interfere with the standard plug to prevent the first and second optical receptacles from mating with the standard plugs.

DETAILED DESCRIPTION OF PREFERRED EMBODIMENTS

Figure 1:
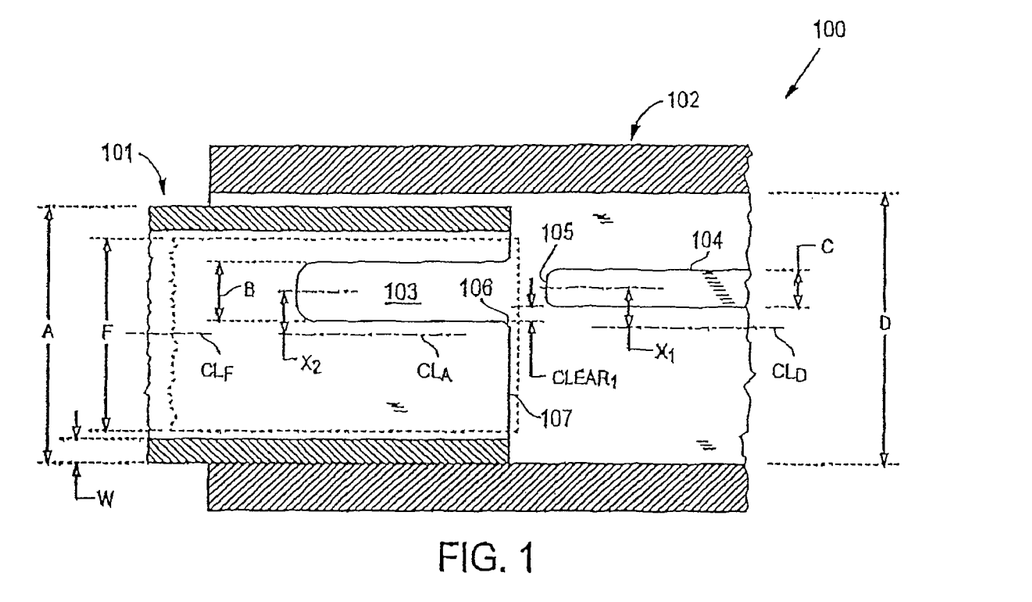
FIG. 1 shows a mating pair of the present invention in which a plug is being inserted into a receptacle.

The present invention relates to a connector system comprising a series of connector components that interconnect with each other in a discretionary way. Referring to FIG. 1, a preferred embodiment of a mating plug 101 and receptacle 100 of the connector system is illustrated. As shown, the plug 101 is partially inserted into the receptacle 100, which, in this embodiment, is a jack having a tub portion 102. Although a jack is discussed herein in detail, it should be understood that the receptacle of the present invention is not restricted to a jack and may be any structure configured to receive a plug, including, for example, an adapter for connecting two plugs together or an integral connector on an active device (e.g., transceiver) or passive device (e.g., splitter).

The plug typically contains a conductive element, such a fiber or wire, which mates with a similar element in the receptacle. In fiber optic applications, it is common for the conductive element to be contained in a ferrule, which in turn is housed by the plug. In a preferred embodiment, the ferrule is an MT-type ferrule.

The outer surface of the plug 101 and the inner surface of the tub 102 have first and second geometries, respectively, which cooperate to allow only certain pairs of plugs and receptacles to mate (herein "mating pairs," "mating plug and jack," or "keyed pair"), and which physically interfere for all other combinations of plugs and jacks (herein "non-mating pairs," "non-mating plugs and jacks" or "non-keyed pairs"), thereby preventing non-mating plugs and jacks from effecting an optical or electrical coupling.

The first and second geometries may embody any known keying mechanism that discriminates between connector components. Such keying mechanisms include, for example, a key and slot relationship between the plug and jack, a receptacle dimensioned to receive only certain sized or shaped plugs, and even a magnetic signature for either attracting (for mating pairs) and repulsing (non-mating pairs). Preferably, the keying mechanism involves just a slight modification to the plug and jack such that essentially the same molds can be used to manufacture connectors of different keyed pairs. Although molding is preferred, it is should be understood that other techniques for producing the first and second geometries can be used including, for example, over molding and machining.

In a preferred embodiment, the invention uses a key and slot mechanism. For simplicity, the term "keying elements" refers collectively to the key and the slot. Specifically, the slot can be embodied in the first or second geometry and the key can be embodied in the other geometry. In the particularly preferred embodiment shown in FIGS. 1-4, the key is part of the second geometry, while the slot is part of the first geometry; that is, the plug 101 has a slot 103 and the tub portion 102 of the jack has a key 104.

Figure 4:
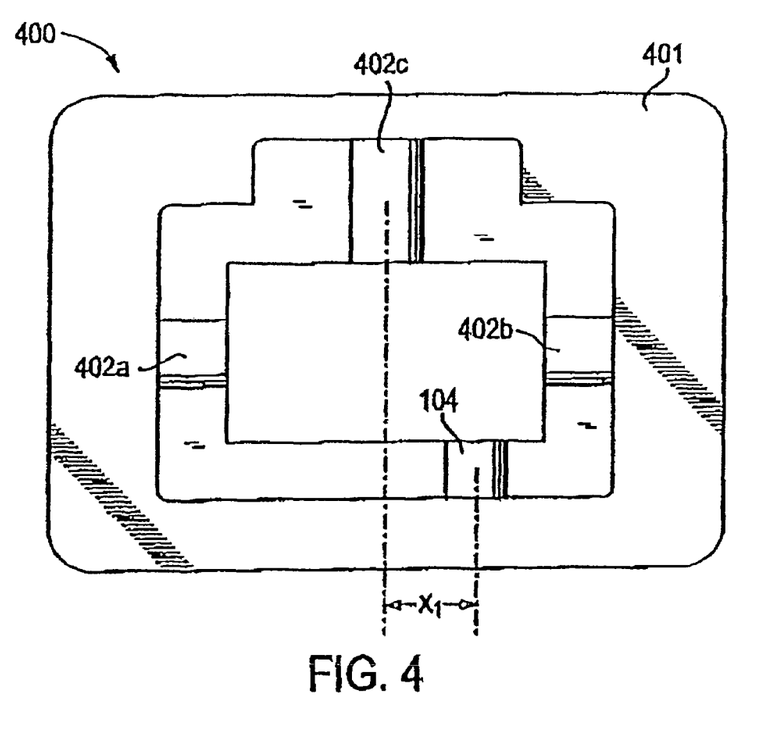
FIG. 4 shows an end view of a receptacle having a key which accepts a key of a plug of a mating pair.

This configuration is preferred since the key may cooperate with other "ribs" on the connector for pre-alignment purposes. More specifically, with particular reference to FIG. 3, an end view of housing 301 of the plug 101 is shown. The housing comprises four walls each wall having a slot 103, 302a, 302b, and 302c, respectively. FIG. 4 depicts an end view of housing 401 of the tub 400 in which the key 104 and ribs 402a, 402b, and 402c are disposed on the walls of the housing. The key 104 and the ribs 402a, 402b, and 402c cooperate with the slots 103, 302, 302a, 302b, and 302c, respectively, to effect pre-alignment of the ferrule located within the plug with the jack before final mating of the connector plug with the connector jack. The final mating may be between the conductive elements of the connector system, such as, for example, between a couple of MT-type ferrules, which employ precise alignment pins/receiving holes on the ferrule face. Such ferrules are well known in the art. By pre-aligning the MT ferrules through the synergistic use of the key and slot, the inter-engagement of the closely-toleranced alignment pins/receiving holes is facilitated. The above-described synergistic keying and aligning feature of the present invention is realized with the MT-RJ connector (Tyco Electronics, Harrisburg, Pa.).

Figure 2:
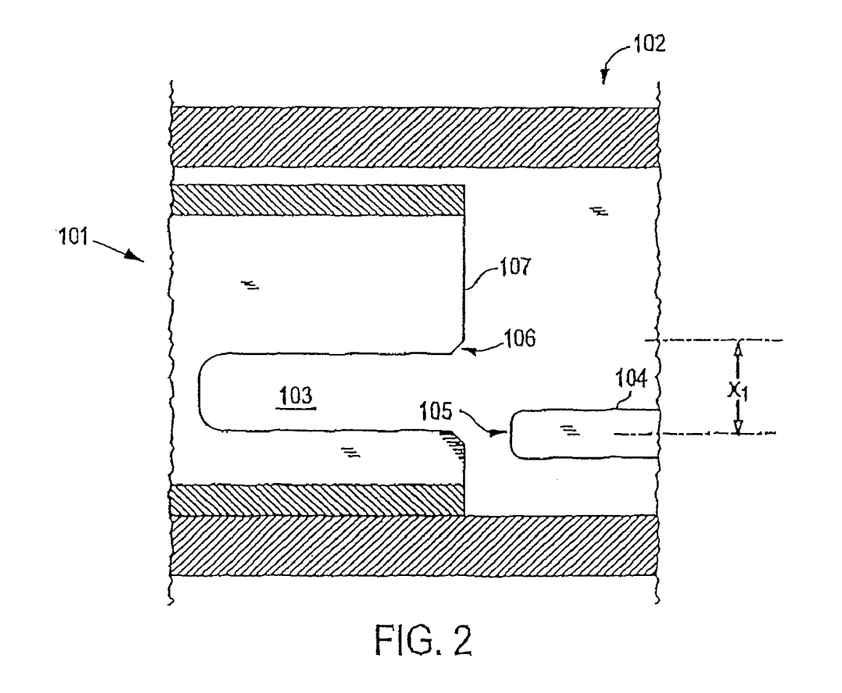
FIG. 2 shows a non-mating pair in which a plug has a slot which is not in the proper position to accept a key of a receptacle.
Figure 3:
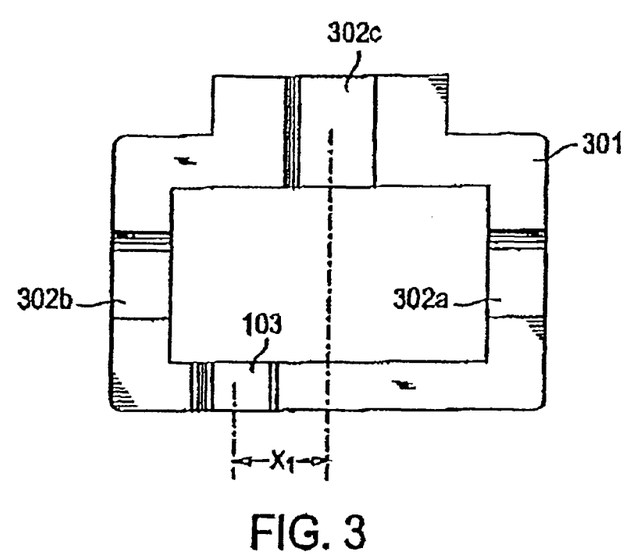
FIG. 3 shows an end view of a plug showing a slot which accepts a key of a mating receptacle.

In a preferred embodiment, the mating end of the key 104 contains a flat portion shown as 105 and the mating end of the plug 101 has a chamfers 106 on the corners of the edges of the slot 103, while the remainder of the mating end of the plug comprises a flat portion 107. The radius corners on the key 106 and the chamfers on the plug 107 work as a guiding device and provide for the necessary alignment between the key and the slot when the plug is inserted into the tub of the jack. On the other hand, as shown in FIG. 2, when a user attempts to mate two non-mating plug and jack components, the flat portion of the key 105 contacts the flat portion of the plug 107 and provides for definite physical interference between the plug and jack when the slot and key do not correspond. Accordingly, the use of this geometry prevents a user from forcing two non-mating plugs and jacks together. Therefore, the physical interference provided between the flat portion 105 of the tub and the flat portion 107 of the key assures that only desired combinations of plugs and jacks will mate.

Figure 5:
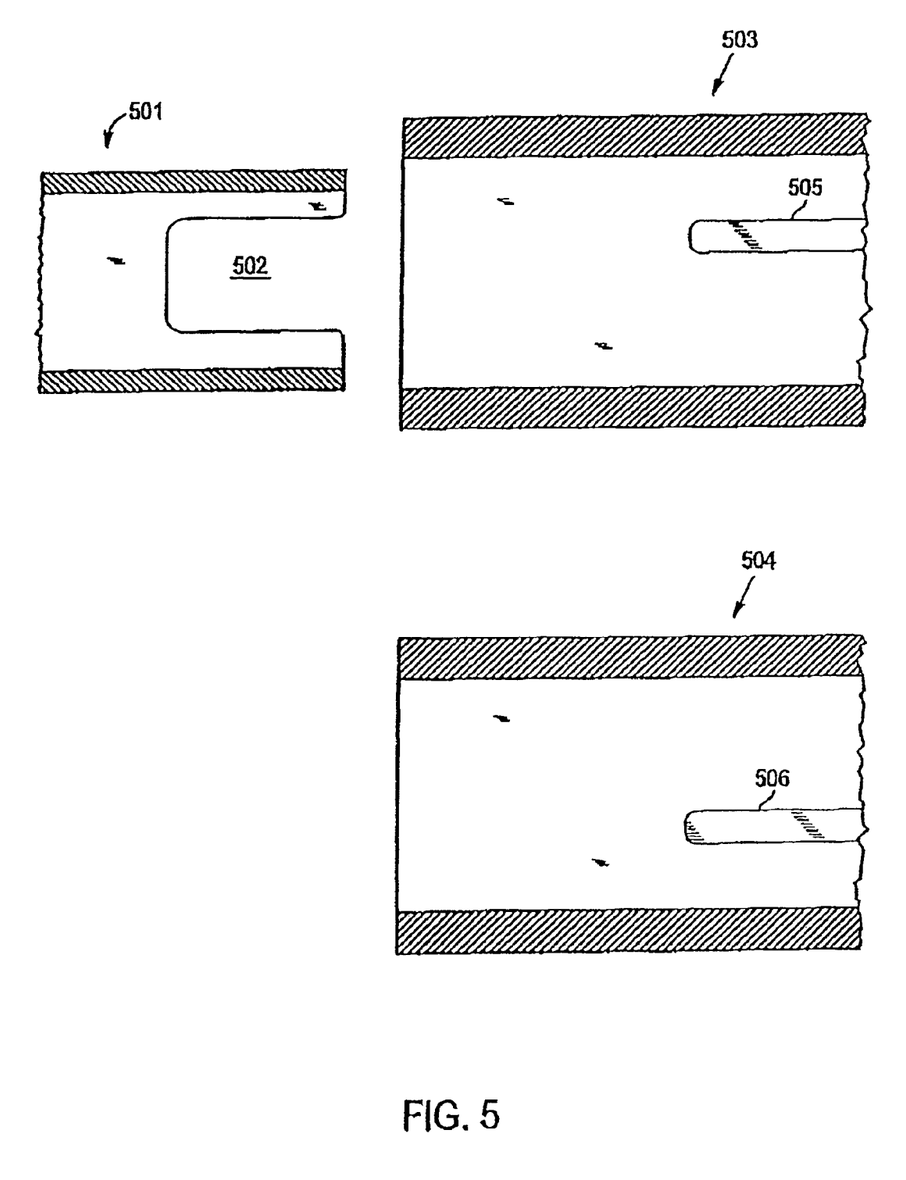
FIG. 5 shows a plug having a slot configuration capable of mating with jacks having keys in different positions.

The position of the key 104 on the tub 102 and the slot 103 on the plug 101 can be varied in such a manner so that a plurality of mutually-exclusive slot and key positions are formed. In one embodiment, the series of key and slot locations are mutually exclusive so that there is a one-to-one correspondence between jacks and plugs. In another embodiment, certain plugs may be configured to mate with a variety of different jacks. For example, it may be worthwhile to give network administers or people with high security clearance certain "master" plugs which are capable of mating with a number of jacks having different slot positions. Referring to the figures, FIG. 5 shows an embodiment of a master plug 501 which has a slot 502 that is configured (which, in this embodiment, means it is wide enough) to mate with jacks 503 and 504 which have different key positions 505 and 506, respectively. Although a wide slot is used in this embodiment to effect mating with two or more jacks having different key configurations, it should be understood that other embodiments are possible, such as, for example a plug with two or more slots.

The number of possible mutually exclusive mating pairs for a given plug and receptacle is a function of the physical parameters of the plug and the receptacle. More specifically, with reference to FIGS. 1-4, mutual exclusivity is ensured by adhering to the following relationships:

$$X1-C/2+(D-A)+\Delta <= F/2 \quad (1)$$

$$X2+B/2<A/2-W \quad (2)$$

$$X1a+Clear1+Z=X1b \quad (3)$$

wherein:
- A=the width of the plug 101;
- B=the width of the slot 103 on the plug 101;
- C=the width of the key 104;
- D=the distance across the opening of the tub;
- F=the width of the ferrule residing within the plug;
- $\Delta$=CLF−CLA, wherein
  - CLA=centerline of the width of the plug; and
  - CLF=centerline of the ferrule residing within the plug.
- X1=the distance from the center of the opening in the tub 102 to the center of the key 104 for each mutually exclusive position.
- X2=the distance from the center of the plug 101 to the center of the slot 103 for each mutually exclusive position;
- X1a=the X1 distance for a sequentially first key in a series of connectors;
- X1b=the X1 distance for a sequentially second key in a series of connectors;
- W=the wall thickness of the plug housing
- Z=the minimum distance required to ensure that the flat portion of the key does not contact the flat portion of the plug 107 when a user attempts to mate a mating pair;
- Clear1=the clearance distance between the center side of the key and the center side of the slot.

These relationships must be satisfied for the mating pairs to mate and for the non-mating pairs to definitely not mate. Specifically, for a mating pair, Relationship (1) requires that half the ferrule width must be no less than $X_1$ less one half of C added to the difference between the width of the tub opening D less the width of the plug added to the difference between the centerline of the ferrule within the plug and the centerline of the plug. This ensures that the key is not positioned outside of the area on which at least a portion of the ferrule will reside. By adhering to this parameter, the key will have some overlap with the ferrule, and thus will provide for pre-alignment of the ferrule in the same manner as do the ribs on the three sides of the ferrule without the key.

Relationship (2) requires that $X_2$ added to one-half of dimension B is less than one-half of dimension A less W. This assures that the slot resides on the plug within the confines of the plug walls.

Finally, according to Relationship (3), for each mutually exclusive position, the distance $X_1$ for the first connector in the system ($X_{1a}$) added to $Clear_1$ added to a predefined interference interval Z would correspond to the distance $X_1$ for the next slot/key position ($X_{1b}$). Z is the minimum distance required to ensure that the flat portion of the key does not contact the flat portion of the plug 107 when a user attempts to mate the two connector components, which are intended to mate.

By way of example, four mutually exclusive locations for locating the slot on the plug housing and the key on the tub are defined below for an MT-RJ connector. The MT-RJ connector has the following dimensions:
- A=7.15±0.05 mm
- B=1.25 mm
- C=0.95±0.04 mm
- D=7.24±0.04 mm
- F=4.5±0.04 mm
- Clear1=0.15 mm
- W=0.8 mm Based on these MT-RJ dimensions, it has been found that the following $X_1$ key positions satisfy the relationships above:

| Mating pair | Key Position | $X_1$ |
| --- | --- | --- |
| 1 | 1 | 0.8 mm |
| 2 | 2 | 1.6 mm |
| 3 | 3 | −0.8 mm |
| 4 | 4 | −1.6 mm |

Although the data above indicates four mutually exclusive positions, it should be understood that additional positions are possible within the parameters of the MT-RJ connector. Additionally, it should be understood that the combinations of various key positions can be used to increase the number of permutations of mating pairs. For example, in addition to the four mating pairs listed above, additional mating pair configurations may obtained from the following combinations of key positions:

| Mating pair | Key Positions |
| --- | --- |
| 5 | 1, 2 |
| 6 | 1, 2, 3 |
| 7 | 1, 2, 3, 4 |
| 8 | 2, 3 |
| 9 | 2, 4 |
| 10 | 2, 3, 4 |
| 11 | 3, 4 |
| 12 | 1, 3 |
| 13 | 1, 4 |
| 14 | 1, 3, 4 |
| 15 | 1, 2, 4 |

In a preferred embodiment, the key and slot components are combined with the industry standard MT-RJ connector. FIG. 6 and FIG. 7 show the key-slot combination added to the MT-RJ connector as produced by Tyco Electronics of Harrisburg, Pa.

Figure 6A:
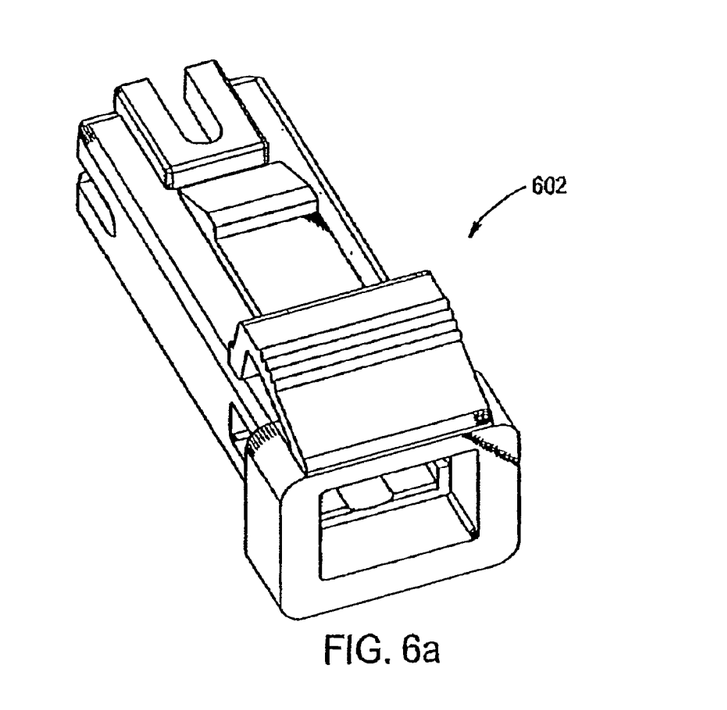
FIGS. 6(a)-6(c) show top perspective, front and rear views, respectively, of an MT-RJ connector plug having security features of the present invention.
Figure 6B:
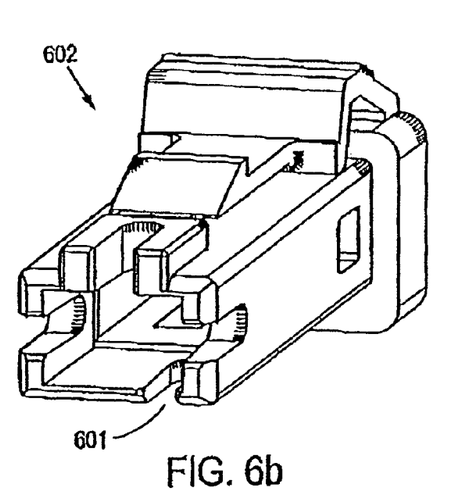
Figure 6C:
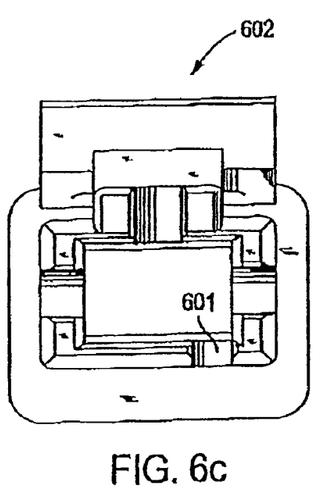
Figure 7A:
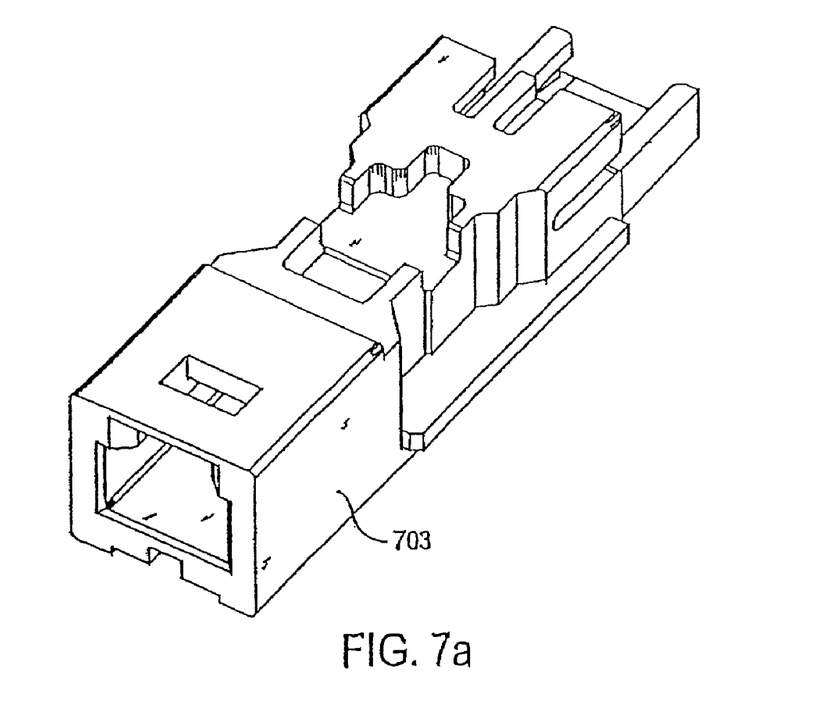
FIGS. 7(a) and 7(b) show top perspective and front views, respectively, of an MT-RJ connector receptacle.
Figure 7B:
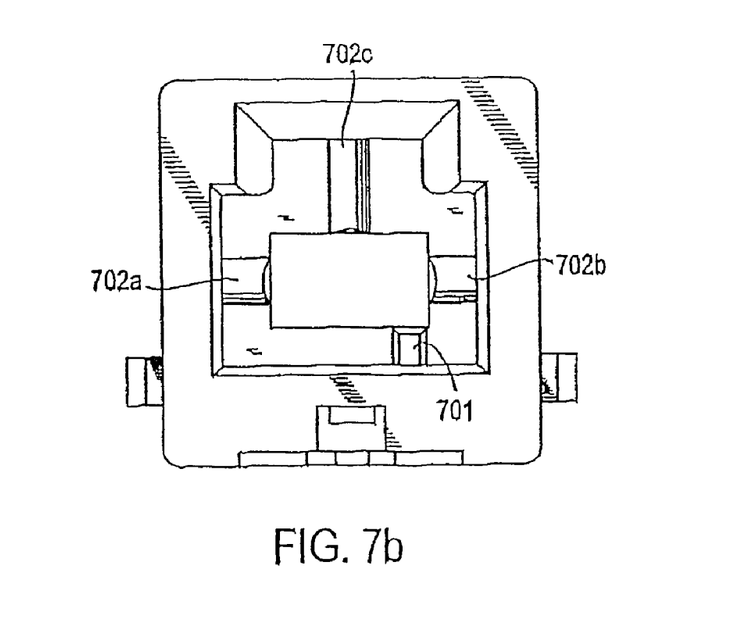

FIGS. 6(a)-(c) show the plug 602 of the MT-RJ connector combined with the slot 601 of the present invention. FIGS. 7(a) and 7(b) show the center tub portion 703 of an MT-RJ connector jack. The key is shown as 701 located in one of the plurality of possible positions. The three pre-alignment ribs are shown as 702a, 702b, and 702c. The key 701 functions as the discriminating member for allowing or preventing mating with a plurality of plugs, while at the same time functioning as the pre-alignment member for the remaining side of the ferrule not aligned with ribs 702a, 702b, and 702c.

To provide a simple and readily apparent indication to the user of which plugs mate with which receptacles, it is preferable to mark mating pairs with indicia or color to indicate their compatibility. In a preferred embodiment, the components of a mating pair are a similar color different from all others used in the connector system.

Figure 8:
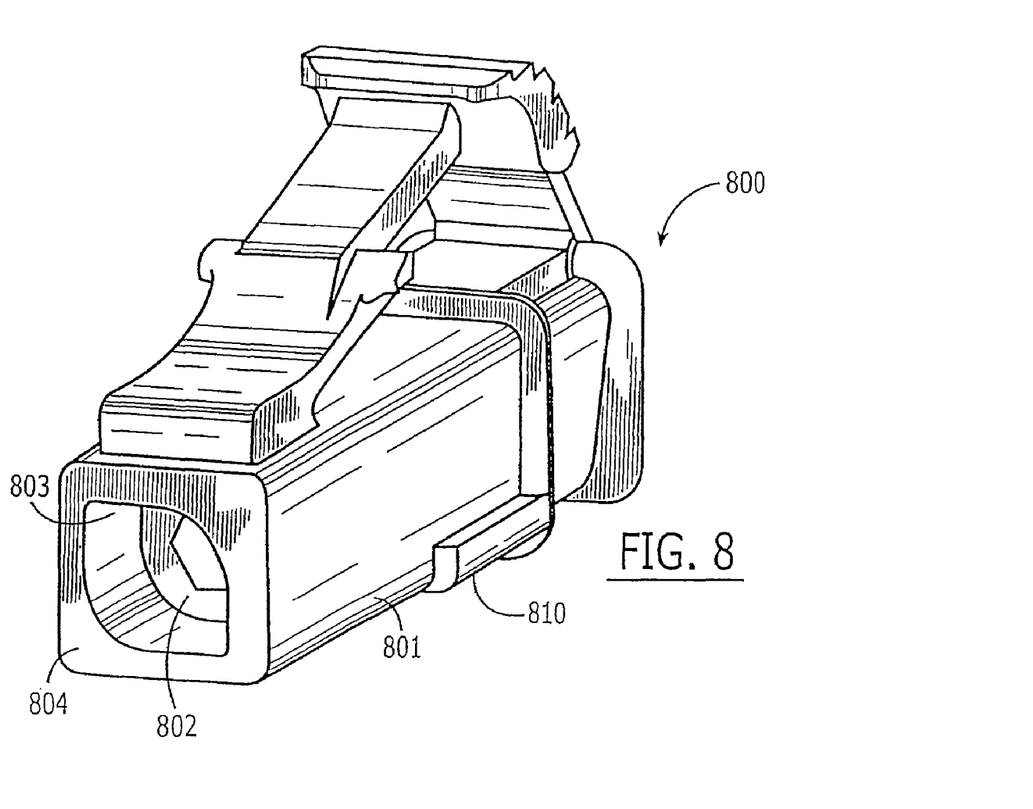
FIG. 8 shows a front and side perspective view of an LC connector plug having security features of the present invention.
Figure 9:
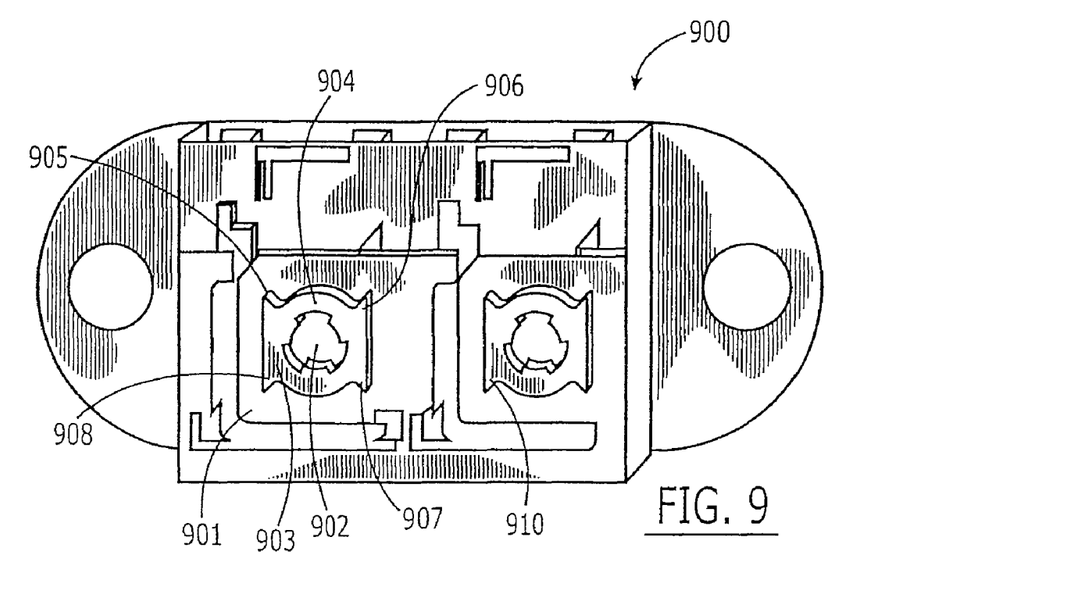
FIG. 9 shows a front perspective view of an LC connector receptacle having security features of the present invention.

Referring to FIGS. 8 & 9, another embodiment of the connector system of the present invention is shown. FIG. 8 shows a plug 800, which is one of a set of different plugs in the system. Each plug has a housing 801, which defines a first geometry. The first geometry comprises a front face 804 with an opening 802 (demarcated with dotted line), and a ferrule (not shown) within said housing and disposed in said opening. Around said opening 802 is a first keying element 803. The keying element for each different plug of said set of plugs is different.

FIG. 9 shows a receptacle 900 for receiving a particular plug (not shown) and is one of a set of different receptacles. The receptacle 900 has a second geometry configured to receive the first geometry of a plug. The second geometry comprises a cavity 901 to receive a plug and a ferrule-receiving portion 904 having a borehole 902 to receive the ferrule of the plug. The ferrule-receiving portion 904 defines a second keying element 903 to cooperate with a first keying element of a particular plug. The second keying element for each receptacle of said set of said receptacles is different and is adapted to cooperate with one and only one first keying element. Plugs and receptacles having keying elements that cooperate are referred to herein as "mating pairs."

Figure 14:
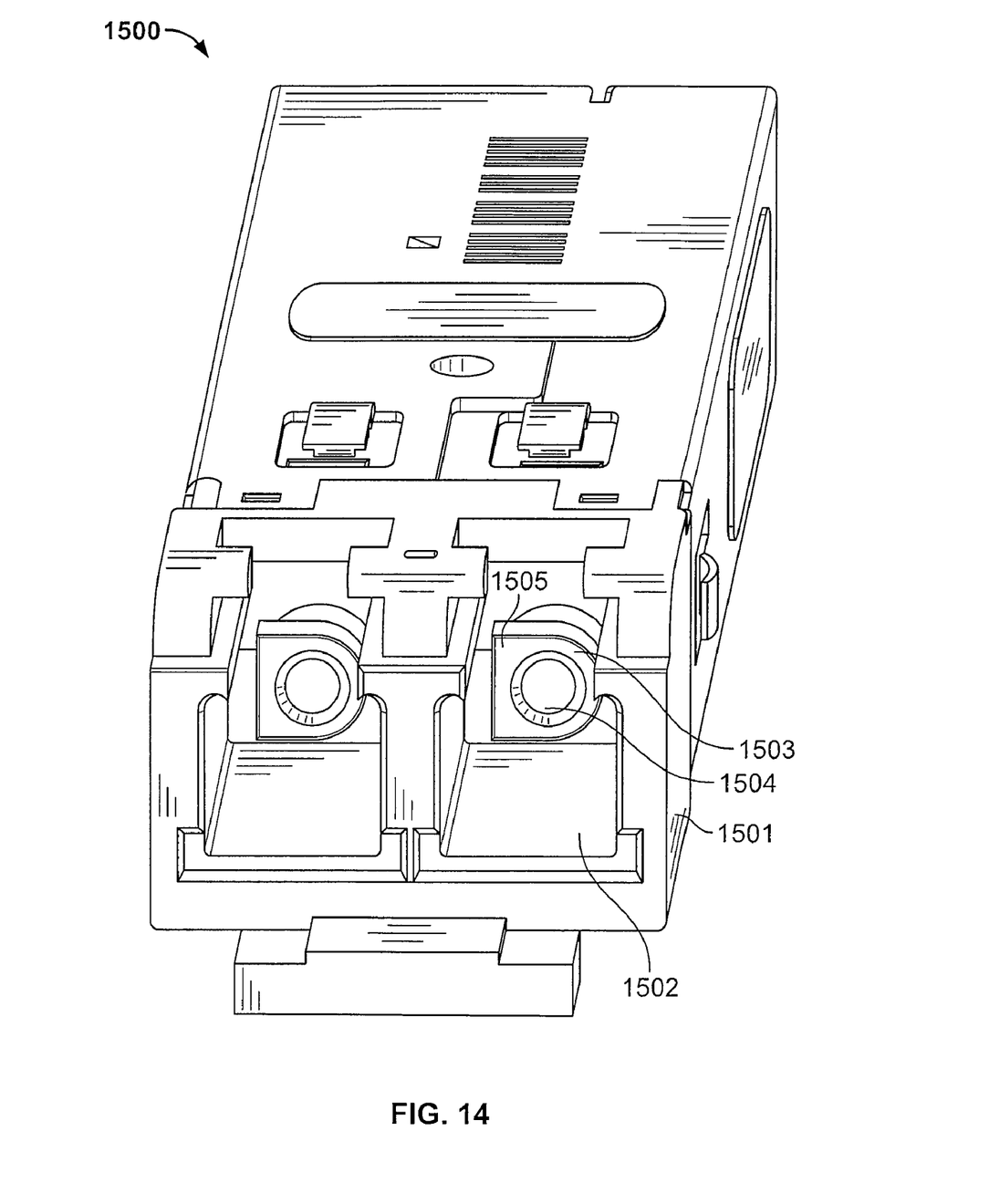
FIG. 14 shows a secure LC transceiver.

Referring to FIG. 14, a secure LC transceiver 1500 is shown having a secure receptacle 1501 as described above. Specifically, the receptacle 1501 has a second geometry configured to receive the first geometry of a plug. The second geometry comprises a cavity 1502 to receive a plug and a ferrule-receiving portion 1503 having a borehole 1504 to receive the ferrule of the plug. The ferrule-receiving portion 1503 defines a second keying element 1505 to cooperate with a first keying element of a particular plug. (This particular keying element 1505 is configured to cooperate with a first keying element of plug 1101 shown in FIG. 11 having slots in positions 1001c, 1001d, 1001e, and 1001f as described in detail below.) These keying elements may be integral to the receptacle casing or alternatively part of a packaged TO-can that incorporates a VCSEL or photo-detector assembly. In the latter description, there is the advantage that each unique keying geometry can be rotated in □ increments to create different transceiver combinations. Alternatively, if bulk optics are used to couple the transmitted and received optical power, the keying geometry could be incorporated into an optical lens assembly that interfaces with the plug.

Although the LC connector system described above is a single-fiber ferrule rather than a multifiber ferrule, the general keying features are essentially the same as those described above with respect to the MT-RJ connector. Further, the keying features of the plug 800 and receptacle 900 of the present invention may be implemented in any well known optical connector including, for example, other single-fiber ferrule connectors such as MU, SC, ST, or FC connectors. For illustrative purposes, the security features are described with respect to the LC connector system, which includes the LC plug (plug 800) and LC adapter (receptacle 900). Aside from the security features described herein, these connector components are the same as those specified in the LC Standard available on-line or from OFS (Japan), and the common features between them will not be addressed herein.

Like the MT-RJ embodiment described above, the keying features of the LC connector are contained on the front face of the plug. This is important for a number of reasons. First, these features can be molded with a relatively small change to the mold dies. Specifically, the opening around the ferrule is typically defined in the molding process by a core pin which is inserted into the outer mold. Changing core pin configurations is a relatively inexpensive and easy step compared to altering the configuration of the outer molds. Therefore, as mentioned above, the connector system of the present invention provides for a variety of different plug configurations with only slight modifications to the molding process.

Having the security features on the front face of the plug also provides for an early indication of non-matability. Specifically, since the features are located on essentially the leading edge of the plug, they are positioned optimally to "stub" as soon as possible when a plug is inserted into a non-mating receptacle. The applicants recognize that interference between connector components which are non-mating should be made as soon as possible to minimize the possibility of coupling light between connectors. That is, if close enough, optical connectors are able to couple, albeit with high loss, even if the connectors are not mechanically engaged. This condition can be meliorated by preventing the light carrying elements from getting too close—hence the desire to stub early. Stubbing early also provides an early signal to the user that the plug is non-mating and avoids the tendency of trying to force a plug into a non-mating receptacle.

Additionally, by locating the keying feature on the leading surface of the plug, the corresponding keying feature on the receptacle may be located internally and still provide an early indication of non-matability. This is beneficial since it is desirable to locate the keying feature of the receptacle internally to minimize the ability of the keying feature to be tampered with or otherwise overridden. As discussed below, this is of particular importance in the configuration of the MT-RJ and LC connectors in which the plug defines the slot and the receptacle defines the key. If the key is removed, the security feature is breached. Having the key located within the receptacle reduces this risk.

Yet another benefit of having the keying features located on the front face of the plug is the visual indication the plug provides with respect to its keying features. That is, one can readily determine the keying configuration of the plug by visual inspection of its front face. There is no need to look into an opening to inspect the internal geometry of the plug to determine its keying configuration.

The keying elements that may be used in the LC connector are the same as those described above with respect to the MT-RJ embodiment. In a preferred embodiment, the keying elements comprise a slot and a key. The slot can be embodied in the first or second geometry and the key can be embodied in the other geometry. In a first configuration, the slot is embodied in the first geometry and the key is embodied in the second geometry, while in a second configuration, the key is embodied in the first geometry and the slot is embodied in the second geometry.

The LC connector shown in FIGS. 8-9 has a first configuration. This configuration is advantageous for a number of reasons. First, the first keying features do not prevent a plug from mating with an ordinary receptacle. This is particularly beneficial since a plug with keying elements can be nevertheless "mated" with standard equipment used for the polishing, testing and inspection of the ferrule. Specifically, the polishing, testing and inspection equipment for single fiber ferrules typically comprises a ferrule receiving interface, similar to that of a receptacle, which receives just the ferrule disposed in the opening of the housing. The housing is not engaged. If a key protrudes into the space between the opening and the ferrule, it would preclude coupling with this existing equipment. Conversely, by having slots extend radially outward from the opening, and thereby maintain the space between the opening and the ferrule, a standard ferrule receiving interface, which does not have keying features, can be used. For example, a plug having a first keying element can be coupled to a standard LC ferrule receiving interface connected to a polishing device for polishing the ferrule, or to a microscope for inspecting the endface geometry of the ferrule, or to a photodetector for testing optical attenuation of the ferrule assembly.

Furthermore, since the physical "barrier"—i.e., the key—is located on the receptacle in the first configuration, it will serve to facilitate discriminatory mating among, not only plugs employing security features, but also existing plugs which have no security features of the present invention. Specifically, if a slot in the plug is necessary to accommodate the key of the receptacle, then plugs without slots will not mate with receptacles having the key. Therefore, ordinary, non-secure type plugs which do not have the slot in the proper position will not mate with the receptacle. In contrast, a non-secure receptacle will mate with a secure plug of the first configuration. Specifically, since the physical barrier is absent from the receptacle, any ordinary or secure plug can mate with it. As discussed below, the situation with the second configuration is opposite from that of the first, meaning that a secure plug cannot mate with a non-secure receptacle but a secure receptacle can mate with a non-secure plug. To provide for discrimination between secure and non-secure connectors components, a secondary key is added to the system as discussed below.

Figure 10:
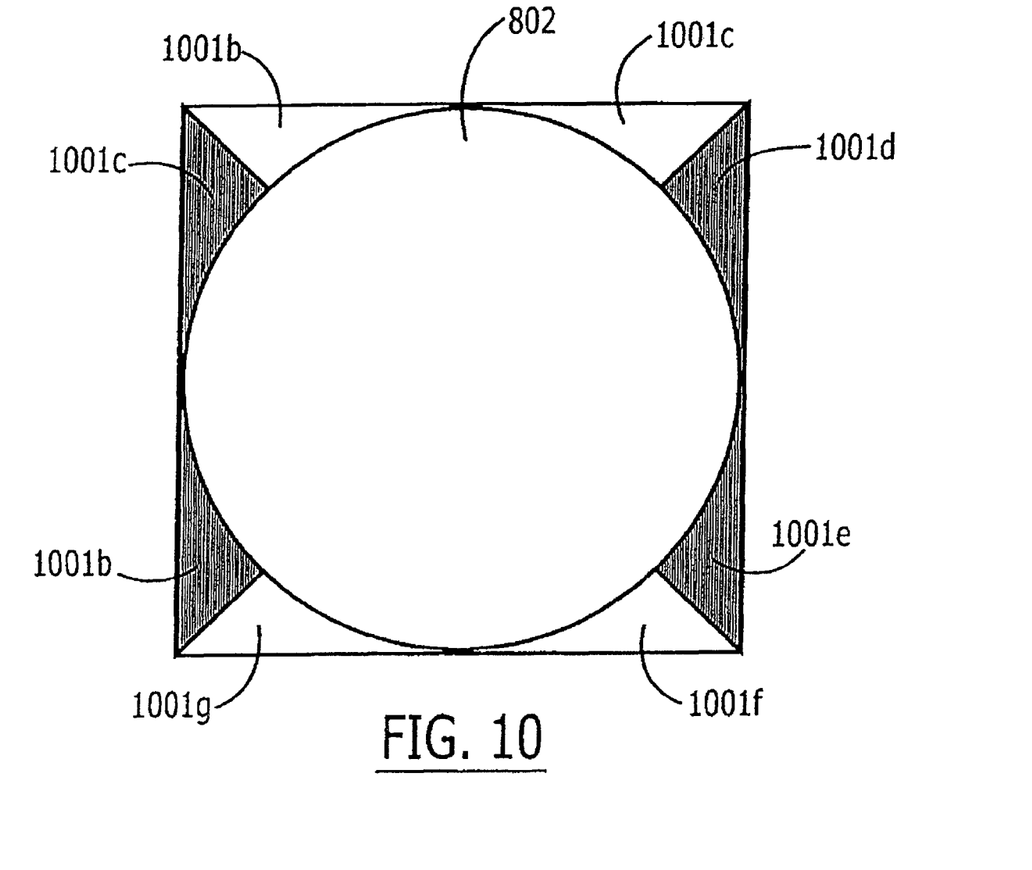
FIG. 10 shows schematically the discrete positions available for the first keying element.

Referring to FIG. 10, a preferred embodiment of the first keying element 803 is shown schematically. The figure shows the opening 802 in which the ferrule is disposed and which is configured to receive the ferrule-receiving portion 904. Positioned around the opening 802 are spatially discrete positions 101(a)-(h) for the first keying element. Similar discrete positions exist around the ferrule-receiving portion 904 (see FIG. 9) to define the location of the second keying element. In a preferred embodiment, the first keying element comprises one or more slots in a combination of positions 101(a)-(h) and the second keying element comprises keys in corresponding positions. It should be understood that to facilitate cooperation between the first and second keying elements, the combination of slot positions in the plug must be the same as the combination of key positions in the ferrule receiving portion 904. In other words, each slot must correspond to a key in the same relative position to facilitate a mating pair. For example, a plug having a first keying element which comprises slots in positions 1001a, 1001d, 1001e, and 1001d, will mate with a receptacle having a second keying element comprising keys 905, 906, 907, and 908 is the same relative positions (see FIG. 9).

The number of slots in the combination of first keying elements depends upon the number of possible positions of the slots. Specifically, the number of possible permeations of different mating pairs is given by the following equation:

$$nCr = \frac{n!}{r! \cdot (n-r)!}$$

wherein:
n equals the number of spatially discrete positions for the keying elements, and
r is the number of positions occupied.

$_nC_r$ therefore provides for the number of mutually exclusive combinations or permeations of mating pairs.

Below is a table providing data on the theoretical number of mating pairs, $_nC_r$, for different n and r values.

| Number of Spatially Discrete Positions n | Number of Positions Occupied r | Number of Mutually Exclusive Combinations $_nC_r$ |
|---|---|---|
| 4 | 1 | 4 |
|   | 2 | 6 |
|   | 3 | 4 |
|   | 4 | 1 |
| 5 | 1 | 5 |
|   | 2 | 10 |
|   | 3 | 10 |
|   | 4 | 5 |
|   | 5 | 1 |
| 6 | 1 | 6 |
|   | 2 | 15 |
|   | 3 | 20 |
|   | 4 | 15 |
|   | 5 | 6 |
|   | 6 | 1 |

From this data, it is clear that the maximum number of permutations (i.e., $_nC_r$) is reached when the number of positions occupied equals n divided by 2. Therefore, in the preferred embodiment, either n/2 slots (if n is an even integer) or (n±1)/2 slots (if n is an odd integer) of spatially discrete positions are occupied by either a slot with respect to the plug or a key with respect to the receptacle. (For purposes of simplicity, hereinafter, n will be presumed to be an even number.) Therefore, using the equation above, the embodiment shown in FIGS. 8, 9 and 10, in which n equals 8 and r equals 4, the maximum number of permutations of mating pairs is 70.

Figure 11:
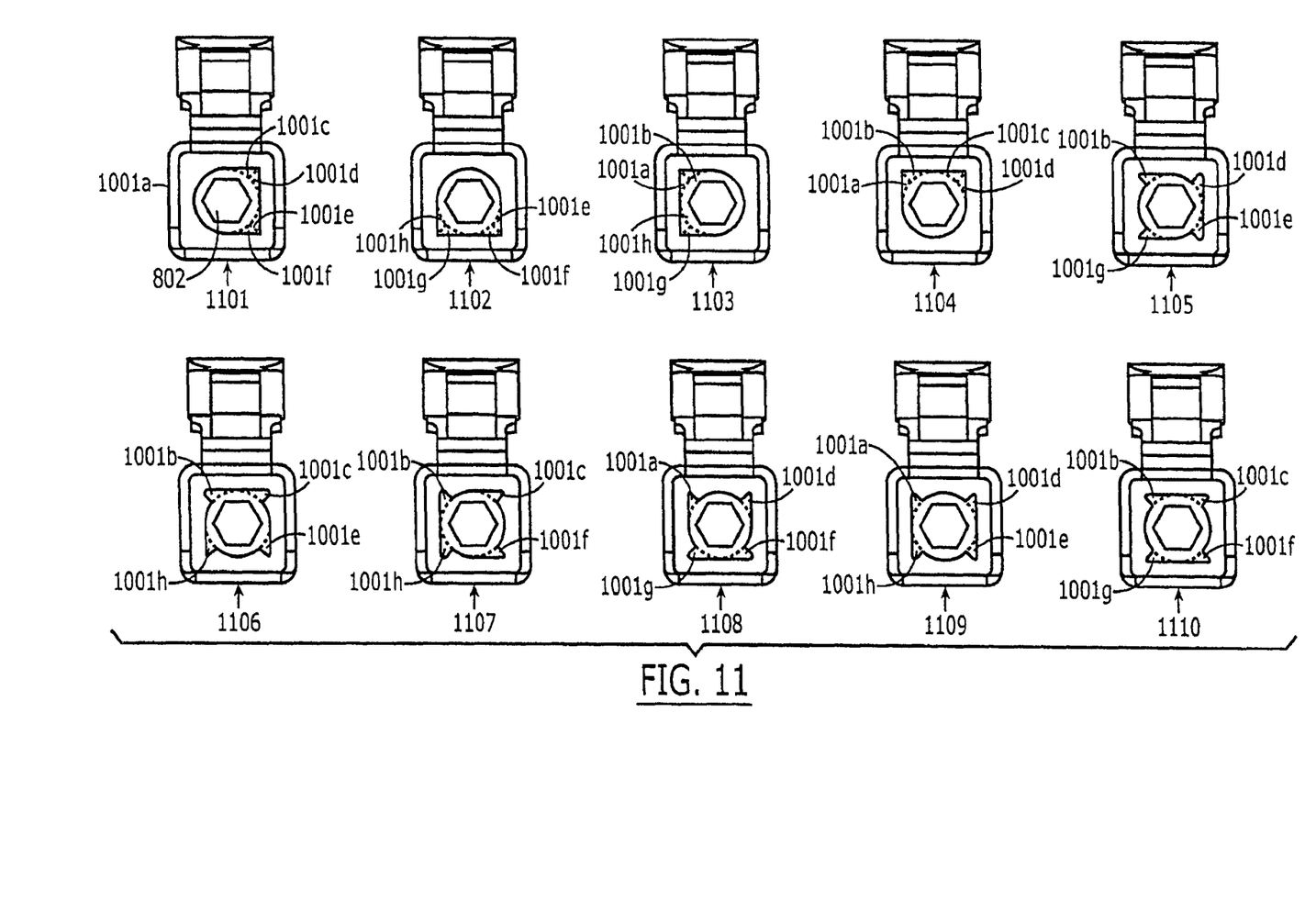
FIG. 11 shows a series of LC connector plugs in which the first geometries are different.

Referring to FIG. 11, different of plugs 1101-1110 of a set are shown in which the first keying elements comprise slots in different combinations of positions as defined in FIG. 10 and accompanying text. In these drawings, the opening 802 which is constant in all the plugs and the slot positions are shown with a phantom line. Specifically, plug 1101 shows slots in a combination of positions 1001c, 1001d, 1001e, and 1001f; plug 1102 shows slots in a combination of positions 100e, 1001f, 1001g, and 1001h; plug 1103 shows slots in a combination of positions 1001a, 1001b, 1001g, and 1001h; plug 1104 shows slots in a combination of positions 1001a, 1001b, 1001c, and 1001d; plug 1105 shows slots in a combination of positions 1001b, 1001d, 1001e, and 1001g; plug 1106 shows slots in a combination of positions 1001b, 1001c, 100e, and 1001h; plug 1107 shows slots in a combination of positions 1001a, 1001c, 1001f, and 1001h; plug 1108 shows slots in a combination of positions 1001a, 1001d, 1001f, and 1001g; plug 1109 shows slots in a combination of positions 1001a, 1001d, 1001e, and 1001h; and plug 1110 shows slots in a combination of positions 1001b, 1001c, 1001f, and 1001g. It should be understood that each of the plugs described above will mate with a receptacle having a key in the same position. For example, plug 1109 will mate with receptacle 900 which has keys 904, 905, 906 and 907 in the same positions as the slots (i.e., 1001a, 1001d, 1001e, and 1001h).

In a preferred embodiment, the connector system of the present invention may contain one or more master plugs of varying levels. That is, there may be lower-level master plugs, which can mate with receptacles of two different networks, or higher-level master plugs, which can mate with receptacles of three or more networks. The difference in the level of the mater plug is a function of the r number of slots occupying n possible positions—the more slots there are, the higher the plug's level. Specifically, the master plug comprises a first keying element having a third combination of greater than n/2 slots, in which the slots occupy the positions of at least two different first combinations as described above. Higher level master plugs have slots which occupy the positions of three or more different first combinations.

Aside from showing the different combinations of keying elements, FIG. 11 illustrates the ease with which the various plugs can be made. Specifically, in a preferred embodiment, the process of manufacturing an optical connector comprises molding different plugs by adjusting the core pin which defines the opening 802 while leaving the outer molds essentially the same. In other words, rather than using different molds to modify the outside of the housing—which can be expensive, the present invention involves simply adjusting the core pin—which is relatively inexpensive. Referring to FIG. 11, the process is described in detail. The process comprises first molding a first housing 1101a for a first plug 1101 of a set of plugs 1101-1110 using a core pin (not shown) to define an opening 802 and a first keying element in a first combination of positions 1001c, 1001d, 1001e, and 1001f. Next, a second housing 1102a for a second plug 1102 is molded by adjusting only said core pin to define first keying element in a second combination of positions 1001e, 1101f, 1001g, and 1101h, which is different from first combination of positions.

To effect the different combinations of positions, the core pin is preferably adjusted by rotating it in θ increments, in which θ is equal to 360°/m, wherein m is an integer. Preferably m is an integer from 2-18, more preferably from 2-5, and even more preferably from 3-4. In the embodiment shown in FIG. 10, m is 4, thus the core pin is adjusted by rotating it in 90° increments. It should be clear that rotating this core pin in 90° increments in subsequent molding operations will produce plugs 1103 and 1104, respectively. Plugs 1105-1108 were prepared using a different core pin which was also rotated in 90° increments. Plugs 1109 and 1110 were prepared using yet a different core pin which was rotated in a 90° increment. It is worthwhile to mention that since the combination of positions 1001b, 100c, 1001f, and 1001g is symmetrical with respect to two axes, the core pin can only be rotated by one 90° increment before repeating the same combination of positions.

Once the housings are prepared, a ferrule is disposed in the opening of each housing to form a subassembly. A fiber may be terminated in the ferrule either before or after the preparation of the subassembly. For field-terminatable connectors, it may be preferable to dispose just a fiber stub in the ferrule. This configuration facilitates field installation of a fiber as discussed, for example, in WO2005004285. Regardless of whether a stub or a fiber is terminated in the ferrule, the preferred keying arrangement of the present invention in which slots radiate outwardly from the opening 802 allows the subassembly of the LC connector to be polished, inspected, and tested using standard polishing equipment as mentioned above.

An advantage of the connector system of the present invention is that different receptacles may be combined to form "hybrid" adapters. More specifically, aside from the second keying element extending outward from the ferrule receiving portion, the receptacles are the same as those used for standard connectors. This allows different receptacles to be combined back to back to form hybrid adapters. In a particularly preferred embodiment, a secure receptacle is combined with a nonsecure receptacle by ultrasonically welding, or other known technique. Such a configuration is particularly useful in situations in which the nonsecure end of the adapter is located in an inherently secure area, for example, behind a wall or panel, where access is already limited. In other words, since connectors within cabinets and walls cannot be accessed readily after construction, the advantages derived from a secure connector at those ends would be minimal. Thus, it is preferable to use a nonsecure connector in these situations so the installer need not concern himself with the "proper" secure connector configuration during the installation of the infrastructure wiring.

To discriminate between secure and non-secure connector systems, the present invention provides for a secondary key & slot configuration, which is either non-existent or in a different position for all plugs and receptacles which are outside of the given connector system 800. For example, referring to FIG. 8, the first geometry comprises a secondary plug 810, which is shown in the same relative position for all plugs of a given set, but which may be in different positions as discussed below. Referring to FIG. 9, the second geometry of the geometry of the receptacle comprises a secondary slot 910 are preferably, but not necessarily, in the same position for all the receptacles of a given set of receptacles. These corresponding receptacle slots may be incorporated into the receptacle housing, created by geometry on a SFP transceiver bail-cage, or produced by an external EMI shell which envelopes the transceiver casing. The secondary slots 910 are adapted to receive secondary keys 810. This way, only plugs and receptacles of a given set of having accommodating secondary keys/slots will mate. In a preferred embodiment, at least a portion of the secondary key 810 is disposed in the plug and is an extension of the side loading structure which is an LC connector standard. Therefore, in the preferred embodiment, the secondary key not only provides for discriminating mating between secure and non-secure connectors, but also enhances side load strength.

It is worthwhile to note that the use of the secondary key/slot adds another security feature to the connector system—essentially another keying mechanism. This additional keying feature increases the number of permutations within a given connector system. That is, rather than maintaining the same secondary key and slot location for all connectors within a system, it can be moved to form different classes within the same family Preferably, the keying elements (primary and secondary) are positioned such that not mating pairs "stub" at about the same axial position relative to one another regardless of whether the connectors are interfering because they are different types of secure connectors or whether they are interfering because they are secure/non-secure connectors. This way, the user becomes accustomed to the point at which non-mating connector components interfere, thereby reducing the risk of the user forcing non-mating components together.

To provide a simple and readily apparent indication to the user of which plugs mate with which receptacles, it is preferable to mark mating pairs with indicia or color to indicate their compatibility. In a preferred embodiment, the components of a mating pair are a similar color different from all others used in the connector system.

Figure 12A:
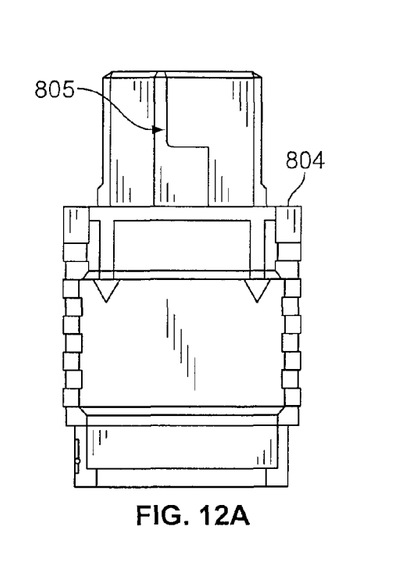
FIGS. 12(a) and 12(b) show top and front views, respectively, of an MPO connector plug.
Figure 12B:
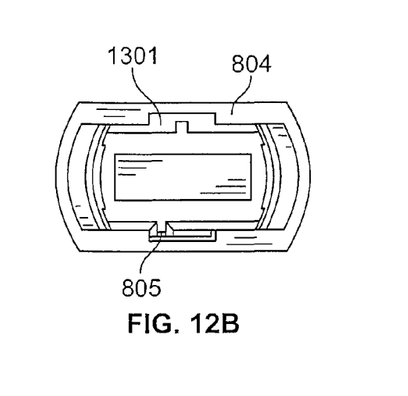
Figure 13A:
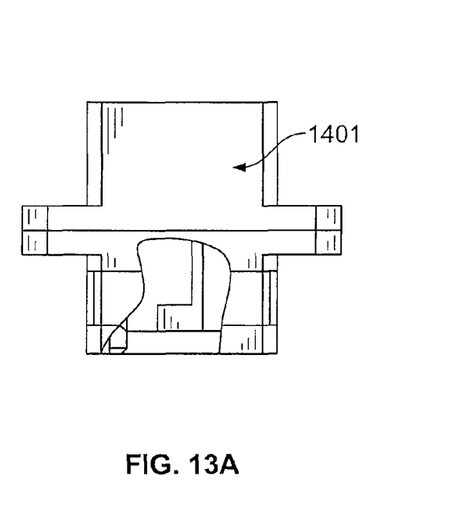
FIGS. 13(a) and 13(b) show top and front views, respectively, of a receptacle.

Referring to FIGS. 12(a) & (b), and 13(a) & (b), a preferred embodiment of the connector system 1200 of the second configuration is shown. The connector system 1200 comprises a plurality of plugs 1201-1204 as shown in FIGS. 12(a) & (b). Each plug has a second geometry, which comprises at least a key 1205-1208 in one of four positions. The system 1200 also comprises a plurality of receptacles—an exemplary receptacle 1401 is shown in FIG. 13(a). Each receptacle has an inner surface 1402 with a first geometry. The first geometry of the inner surface 1402 comprises at least one slot 1403. A certain number of receptacles have different first geometries in which the slots 1403 are in different positions. In this particular embodiment, the slots are in four different positions, although the invention is not limited to four. There is a one-to-one correspondence between the plugs 1201-1204 and their respective receptacles such that each of plugs 1201-1204 mates with one and only one receptacle. Likewise, in a preferred embodiment, each of receptacle mates with one and only one plug.

A connector system having the second configuration offers certain benefits, but also presents certain challenges. One benefit is that the space consuming security feature—i.e., the slot—resides in the receptacle which is typically larger than the plug and better suited for accommodating this feature. That is, since a slot is defined by the material around it, a slot requires more room than a key. The receptacle does not have the same space constraints as a plug (which is designed to be inserted in the receptacle) and may be more capable of accommodating the slot than the plug. Additionally, it may be preferable to have one "master" plug which plugs into all receptacles having security features. This is easily accomplished with a connector system of the second configuration. Specifically, the master plug would simply be one having no key to interfere with the first geometry of the receptacle. The simplicity in offering a master plug in the connector system of the second configuration also gives rise to a challenge facing the system—the ability of non-secure plugs to mate with secure receptacles (discussed below).

To discriminate between secure and non-secure connector systems, one approach is to use a secondary key & slot configuration which is in the same position for non-mating plugs and receptacles of a given connector system, but which is either non-existent or in a different position for all plugs and receptacles which are outside of the given connector system. For example, referring to FIG. 13(b), the first geometry comprises a secondary slot 1004, which is in the same position for all different first geometries of the connector system 1200. Referring to FIG. 12(b), the second geometry comprises a secondary key 1301, which is in the same position for all different second geometries. Consequently, only plugs and receptacles of a given security system have accommodating keys/slots will mate. In a preferred embodiment, at least a portion of the key is disposed in the receptacle. As mentioned above with respect to the first configuration of the connector system, if the physical barrier—i.e., the key—is located on the receptacle then it interferes with all structures other than those having accommodating slots. Thus, for the same reason the first configuration is preferable for discriminating among different connector systems, having the secondary key on the receptacle may be preferable for discriminating among different connector systems. In sum, the primary keying mechanism provides physical interference among all connectors of a system except for mating pairs, while the secondary keying mechanism provides for physical interference among different connector systems.

It is worthwhile to note that the use of the secondary key/slot adds another security feature to the connector system—essentially another keying mechanism. This additional keying feature increases the number of permutations within a given connector system. That is, rather than maintaining the same secondary key and slot location for all connectors within a system; it can be moved to form different classes within the same family. For example, if there are four positions available for the primary key/slot and four positions available for the secondary key/slot, than instead of having just four mating pairs, the system could be configured to accommodate sixteen.

Figure 13B:
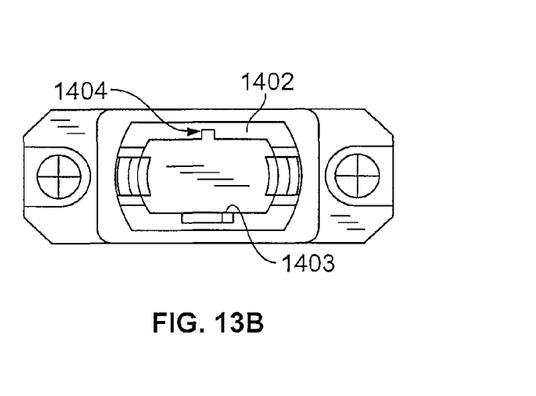

A particularly preferred embodiment of the second configuration of the present invention is shown in FIGS. 12-13. The plugs 1201-1204, in this particular embodiment, are MPO connector plugs which, like the MT-RJ plug described above, use MT ferrules. The receptacles are adapters. Each adapter is configured to receive a plug at each end to facilitate optical coupling between the plugs. Aside from the keying features described above, this connector system is identical to existing MPO connector-systems and the common features between which will not be addressed herein.

Figure 15:
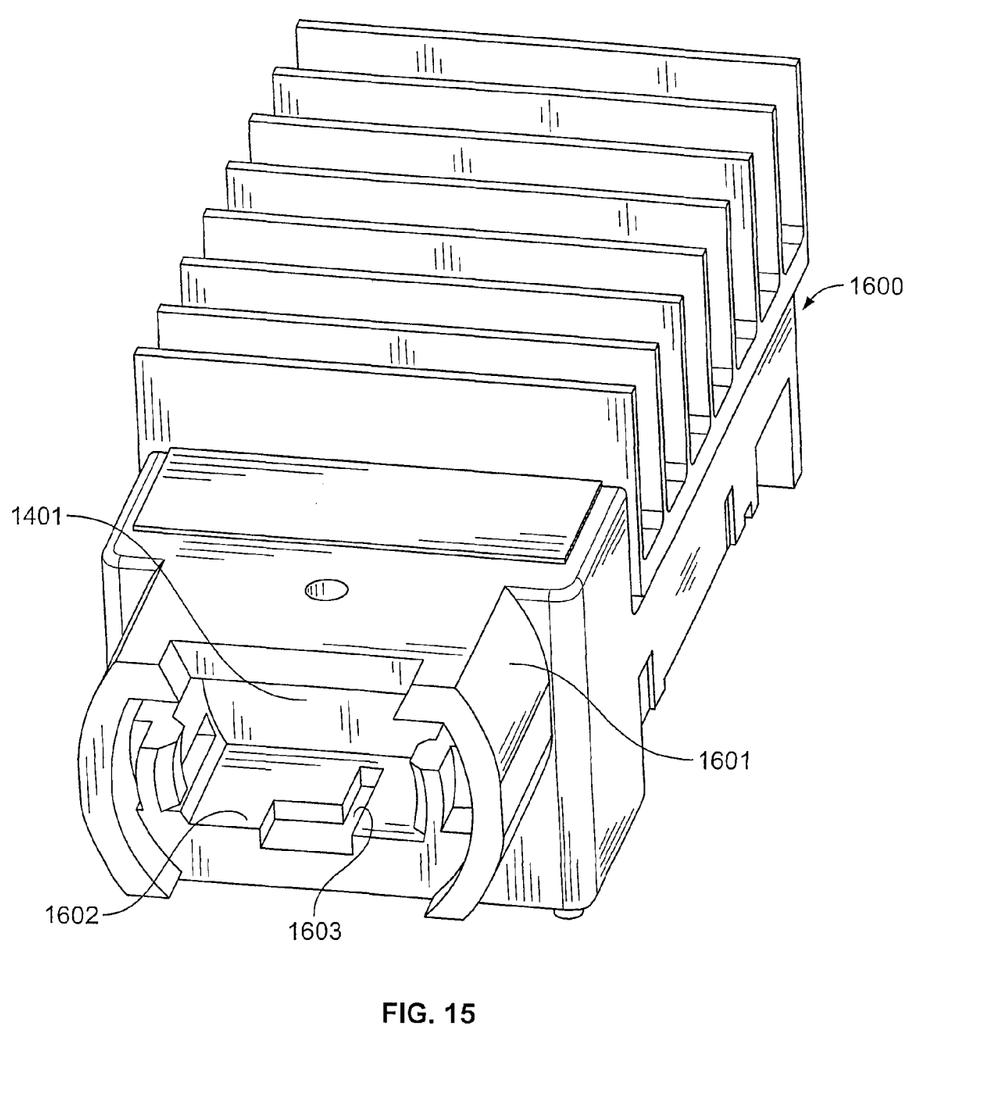
FIG. 15 shows a secure MPO transceiver.

Referring to FIG. 15, the secure receptacle 1601 is incorporated into a secure MPO transceiver 1600. The receptacle 1601 is essentially the same as that described above with respect to FIGS. 13(a) and (b), except that it is in a transceiver rather than in an adapter. Specifically, the receptacle has an inner surface 1602 with a first geometry comprising at least one slot 1603 for receiving the key 1205 of a connector 1201 (see FIG. 12).

Below is a chart illustrating the mateability/interference of various plugs and receptacles with reference to the particular keying features:

|  |  | Plug Feature(s) |  |  |  |
|---|---|---|---|---|---|
|  |  | 1205 | 1205a and 1301 | 1205b and 1301 | 1205c and 1301 | 1205d and 1301 |
| Receptacle Feature(s) | 1003 | Mates | Lack of 1404 stops | Lack of 1404 stops | Lack of 1404 stops | Lack of 1404 stops |
|  | 1403a and 1404 | 1403a stops | Mates | 1403a stops | 1403a stops | 1403a stops |
|  | 1403b and 1404 | 1403b stops | 1403b stops | Mates | 1403b stops | 1403b stops |
|  | 1403c and 1404 | 1403c stops | 1403c stops | 1403c stops | Mates | 1403c stops |
|  | 1403d and 1404 | 1403d stops | 1403d stops | 1403d stops | 1403d stops | Mates |

To provide a simple and readily apparent indication to the user of which plugs mate with which receptacles, it is preferable to mark mating pairs with indicia or color to indicate their compatibility. In a preferred embodiment, the components of a mating pair are a similar color different from all others used in the connector system.

The system described allows for a series of mutually-exclusive connectors to be used in a manner which provides physical security to a network system. In light of the often highly sensitive data stored on many of the networks in use today, this is a highly desirable feature. The present invention is an effective way to segregate separate networks and assure that the proper users are connecting to the desired network. Additionally, the present invention may be employed in the manufacture of devices in which fibers or wires need to be connected in particular arrangements. More specifically, the discriminating connectors of the present invention can be engineered into a system such that, during manufacturing, the correct connection of the fibers/wires is ensured by the mating pairs and their ability to prevent all other "incorrect" connections. Applications requiring particular routing of fibers or wires include, for example, routers, backplane assemblies, and even component devices such as multiplexers/demultiplexers.

It should be understood that the foregoing is illustrative and not limiting and that obvious modifications may be made by those skilled in the art without departing from the spirit of the invention. Accordingly, the specification is intended to cover such alternatives, modifications, and equivalence as may be included within the spirit and scope of the invention as defined in the following claims.

What is claimed is:

1. A network comprising:
a plurality of different transceivers, each different transceiver having a different receptacle for facilitating a connection to different information networks requiring different access authorization, said each different transceiver optically or electrically coupled to one and only one different information network, said each different receptacle having an inner surface with a unique first geometry; and
a plurality of different plugs, said each different plug having a unique second geometry, said each unique first geometry corresponds to one, and only one, unique second geometry of a plug such that said plugs and receptacles having corresponding unique first and second geometries are mating pairs.

2. The network of claim 1, wherein said first geometry includes a key and said second geometry includes a slot.

3. The network of claim 2, wherein said each receptacle comprises a receptacle having a tub, said tub comprising said key and a plurality of ribs extending inward, said each plug comprising a housing and a ferrule contained within the housing, said housing comprising said slot for cooperating with said key and secondary slots for cooperating with said ribs, said slot and said secondary slots receiving said key and said ribs to effect pre-alignment of said ferrule before final mating of said ferrule.

4. The network of claim 1, wherein said transceivers are LC transceivers.

5. The network of claim 1, wherein said transceivers are MPO transceivers.

6. A secure transceiver system for use with a connector system comprising a set of plugs, each plug having a housing having a front and back orientation and having a front face defining an opening, a ferrule being disposed within said opening, said housing defining a first keying element on said front face around said opening, said first keying element for each plug of said set of plugs being different; said secure transceiver system comprising:
a set of transceivers, each transceiver having a different receptacle, each receptacle having an opening to receive said plug and a ferrule-receiving portion to receive said ferrule, said ferrule-receiving portion defining a second keying element to cooperate with said first keying element, said second keying element for each receptacle being different and being adapted to cooperate with one and only one of said first keying elements, wherein plugs and receptacles having keying elements that cooperate are mating pairs.

7. The secure transceiver system of claim 6, wherein said first and second keying elements are one or more keys and one or more slots for receiving said keys, respectively.

8. The secure transceiver system of claim 7, wherein said slot is contiguous with said opening and runs from said front face backward.

9. The secure transceiver system of claim 8, wherein said transceivers are MTRJ transceivers.

10. The secure transceiver system of claim 6, wherein said transceivers are LC transceivers.

11. The secure transceiver system of claim 6, wherein said transceivers are MPO transceivers.

12. The secure transceiver system of claim 6, wherein each plug and receptacle of a mating pair is marked with a matching visual identification different from plugs and receptacles having different first and second geometries, said visual identification being at least one of color, alphanumerical indicia, or symbol.

13. The secure transceiver system of claim 6, further comprising:
a secondary key extending from the housing of each plug to prevent mating of each plug to a receptacle not having a secondary slot to accommodate said secondary key.

14. In a family of connectors comprising a standard plug and a standard transceiver having
a standard receptacle, a secure connector system for providing discriminating mating among secure and standard plugs and secure transceivers, said secure connector system comprising:
at least a first plug and a second plug, said first plug comprising a first key in a first position, said second plug comprising a second key in a second position, said first and second positions being different, said first and said plugs each comprising a secondary key, said secondary key being in the same relative position on said first and second plugs, said first and second plugs being physically the same except for the position of their respective key;
at least a first transceiver and a second transceiver having first and second receptacles respectively, said first receptacle having a first slot in a first position and a secondary key, said first slot adapted to receive said first key and said secondary slot adapted to receive said secondary key to allow said first plug to mate with said first receptacle to form a mating pair, said first key interfering with a second receptacle to prevent said first plug from mating with said second receptacle, said second receptacle having a second slot in a second position and a secondary key, said secondary slots of said first and second receptacles being in the same relative position, said second slot being adapted to receive said second key and said secondary slot being adapted to receive said secondary key to allow said second plug to mate with said second receptacle to form a mating pair, said second key interfering with said first receptacle to prevent said second plug from mating with said first receptacle;
wherein said standard plug does not have a secondary slot, and said standard receptacle does not have a secondary key; and wherein said first and second keys of said first and second plugs interfere with said standard receptacle to prevent said first and second plugs from mating with said standard receptacle;
wherein said secondary keys of said first and second receptacles interfere with said standard plug to prevent said first and second optical receptacles from mating with said standard plugs.

15. The secure connector system of claim 14, wherein said transceiver is an MPO transceiver.

* * * * *